(12) United States Patent
Imamura et al.

(10) Patent No.: US 11,746,777 B2
(45) Date of Patent: Sep. 5, 2023

(54) LIQUID SENDING DEVICE

(71) Applicant: SHIMADZU CORPORATION, Kyoto (JP)

(72) Inventors: Shinya Imamura, Kyoto (JP); Keisuke Ogawa, Kyoto (JP)

(73) Assignee: Shimadzu Corporation, Kyoto (JP)

(*) Notice: Subject to any disclaimer, the term of this patent is extended or adjusted under 35 U.S.C. 154(b) by 377 days.

(21) Appl. No.: 16/768,660

(22) PCT Filed: Jun. 20, 2018

(86) PCT No.: PCT/JP2018/023437
§ 371 (c)(1),
(2) Date: May 30, 2020

(87) PCT Pub. No.: WO2019/130625
PCT Pub. Date: Jul. 4, 2019

(65) Prior Publication Data
US 2021/0172437 A1 Jun. 10, 2021

(30) Foreign Application Priority Data
Dec. 25, 2017 (JP) ................................. 2017-247155

(51) Int. Cl.
*F04B 53/10* (2006.01)
*F16K 31/06* (2006.01)
(Continued)

(52) U.S. Cl.
CPC ........ *F04B 53/1087* (2013.01); *F04B 7/0076* (2013.01); *F04B 53/1002* (2013.01);
(Continued)

(58) Field of Classification Search
CPC .... F04B 7/0076; F04B 49/22; F04B 53/1017; F04B 53/1087; G01N 2030/328
See application file for complete search history.

(56) References Cited

U.S. PATENT DOCUMENTS

2018/0245581 A1  8/2018  Imamura
2018/0313454 A1  11/2018  Imamura

FOREIGN PATENT DOCUMENTS

JP    07-133894 A    5/1995
JP    2001-235052 A    8/2001
(Continued)

OTHER PUBLICATIONS

Beck, Pump With Regulated Valve ("WO0146590AMT.pdf-DES"), Jun. 2001 (Year: 2001).*
(Continued)

*Primary Examiner* — Kenneth J Hansen
(74) *Attorney, Agent, or Firm* — Renner, Otto, Boisselle & Sklar, LLP (57) ABSTRACT

A liquid sending device includes a plunger pump, which performs an intake operation of liquid to and a discharge operation of liquid from a pump chamber and in which pressure in the pump chamber in a case where the intake operation is performed is lower compared to a case where the discharge operation is performed, a check valve that is provided at an inlet port, has a spherical valve element and a valve seat, and passively operates according to the pressure in the pump chamber in such a direction that the valve element is seated on or detached, a pressure sensor that detects the pressure, and an attachment detector that compares the pressure with a preset threshold value and detect attachment of the valve element to the valve seat in a case where the pressure in the pump chamber is equal to or lower than the threshold value.

4 Claims, 6 Drawing Sheets

(51) Int. Cl.
    *F04B 7/00*         (2006.01)
    *F04B 49/22*       (2006.01)
    *F16K 31/08*       (2006.01)
    *G01N 30/32*      (2006.01)

(52) U.S. Cl.
    CPC .......... *F16K 31/0655* (2013.01); *F04B 49/22* (2013.01); *F16K 31/08* (2013.01); *G01N 30/32* (2013.01); *G01N 2030/326* (2013.01)

(56) References Cited

FOREIGN PATENT DOCUMENTS

| WO | WO-0146590 A1 | * | 6/2001 | ............ B60T 8/4031 |
| WO | WO-2007121230 A2 | * | 10/2007 | ............ F04B 7/0076 |
| WO | 2017/046861 A1 | | 3/2017 | |
| WO | 2017/094097 A1 | | 6/2017 | |

OTHER PUBLICATIONS

Office Action for corresponding CN Patent Application No. 201880082172.4 dated Feb. 8, 2022, with English language translation.

Office Action for corresponding CN Patent Application No. 201880082172.4 dated Jul. 28, 2021, with English language translation.

International Search Report with respect to International Patent Application No. PCT/JP2018/023437, dated Sep. 18, 2018.

Written Opinion of the International Searching Authority with respect to International Patent Application No. PCT/JP2018/023437 (English Machine Translation), dated Sep. 18, 2018.

\* cited by examiner

LIQUID SENDING DEVICE

TECHNICAL FIELD

The present invention relates to a liquid sending device that sends liquid by repeating intake and discharge of the liquid by a plunger pump.

BACKGROUND ART

In an analysis device such as a liquid chromatograph, a liquid sending device that causes two plunger pumps to operate in a complementary manner and continuously sends a mobile phase is often used. In such a liquid sending device, a check valve for preventing the liquid from flowing backward is provided at an inlet port or an outlet port of each plunger pump. Generally, the check valve has a spherical valve element provided to be movable in the direction in which the liquid flows and a valve seat on which the valve element is to be seated. The valve seat is a hollow cylindrical member through which the liquid flows. A liquid flow path is closed when the spherical valve element is seated on the edge of an opening of the valve seat.

As for the check valve at the inlet port of the plunger pump, in a case where the plunger pump performs a discharge operation, the pressure in the pump chamber becomes positive (higher than an atmospheric pressure), and the valve element is pressed toward the valve seat by the pressure in the pump chamber to be seated. On the contrary, in a case where the plunger pump performs an intake operation, the pressure in the pump chamber becomes negative (lower than the atmospheric pressure), and the valve element is attracted toward the pump chamber by the negative pressure to be detached from the valve seat.

As described above, in the check valve in which the valve element passively operates due to the pressure in the pump chamber, in a case where the valve element is attached to the valve seat due to contamination on the surface of the valve element or the contact surface between the valve element and the valve seat or the like, the check valve at the inlet port might not open only by the negative pressure generated in the pump chamber when the intake operation is performed, and liquid might not be sent.

As such, it has been proposed to cause the valve element to actively operate by using a solenoid or the like (see Patent Documents 1 and 2). Even in a case where the valve element is attached to the valve seat, it is possible to cause the valve element to detach from the valve seat reliably and open the valve by causing the valve element to actively operate.
[Patent Document 1] JP 2001-235052 A
[Patent Document 2] WO 2017/046861 A1

SUMMARY OF INVENTION

Technical Problem

The check valve disclosed in Patent Document 1 or 2 is configured to cause a valve element to actively detach from a valve seat by pressing of the valve element with a pin provided inside of the valve seat in such a direction that the valve element is detached from the valve seat. The valve seat is made of a hard material such as sapphire or zirconia, and the pin is made of material such as stainless steel, which has lower hardness than the valve seat. Thus, when sliding inside of the valve seat, the pin wears. In a case where all of the operations of causing the valve element to detach from the valve seat are actively performed, the number of times the pin slides inside of the valve seat increases, and the pin wears out quickly.

Thus, although it was preferable to actively drive the valve element only when the valve element was attached to the valve seat, because attachment of the valve element to the valve seat could not be detected conventionally, the check valve had to actively perform all of the opening operations. Further, in a case where abrasion powder generated due to wear of the pin is caught between the valve seat and the valve element, the liquid-tightness might be lowered when the check valve is closed, and the check valve might lose its function as a check valve.

As such, the present invention was conceived considering the above-mentioned problems, and an object of the present invention is to enable detection of attachment of a valve element to a valve seat in a check valve.

Solution to Problem

A liquid sending device according to the present invention includes a plunger pump, which performs an intake operation of liquid to and a discharge operation of liquid from a pump chamber and in which pressure in the pump chamber in a case where the intake operation is performed is lower compared to a case where the discharge operation is performed, a check valve that is provided at an inlet port of the plunger pump, has a spherical valve element and a valve seat on which the valve element is to be seated, and passively operates according to the pressure in the pump chamber in such a direction that the valve element is seated on or detached from the valve seat, a pressure sensor that detects the pressure in the pump chamber of the plunger pump, and an attachment detector that is configured to compare the pressure in the pump chamber detected by the pressure sensor with a preset threshold value, and detect attachment of the valve element to the valve seat in a case where the pressure in the pump chamber is equal to or lower than the threshold value.

That is, the present invention is a liquid sending device that is provided with the function of detecting attachment of the valve element to the valve seat in the check valve provided at the inlet port of the plunger pump. The check valve in which the attachment of the valve element to the valve seat is to be detected is the check valve provided at the inlet port of the plunger pump in which the pressure in the pump chamber in a case where the intake operation is performed is lower compared to a case where the discharge operation is performed. "the plunger pump in which the pressure in the pump chamber in a case where the intake operation is performed is lower compared to a case where the discharge operation is performed" is the pump in which the pressure in the pump chamber is reduced to a pressure lower than a liquid sending pressure because the outlet port is closed by another check valve in a case where the intake operation is performed. In a case where the liquid sending device of the present invention is constituted by a serial-type double plunger pump in which two plunger pumps are connected in series to each other, the upstream (primary) plunger pump corresponds to it. On the other hand, in a case where the liquid sending device of the present invention is constituted by a parallel-type double plunger pump in which two plunger pumps are connected in parallel to each other, both of the plunger pumps correspond to it.

As for the above-mentioned plunger pump, in a case where the check valve is opened normally in a case where the intake operation is performed, the pressure in the pump chamber is to be maintained at about the atmospheric pressure. However, in a case where the check valve is closed due to attachment of the valve element to the valve seat, the pressure in the pump chamber is reduced to be lower than the atmospheric pressure. This phenomenon is utilized in the present invention. A value slightly lower than the atmospheric pressure is set as a threshold value, and the pressure in the pump chamber in a case where the intake operation is performed is compared with the threshold value. Thus, whether the check valve is normally operated, that is, whether the valve element is attached to the valve seat is determined.

The present invention is especially effective in a case where the check valve has a valve element driver for actively driving the valve element seated on the valve seat in such a direction that the valve element is detached from the valve seat. In this case, the liquid sending device preferably includes a valve element drive controller for controlling an operation of the valve element driver, and the valve element drive controller is preferably configured to actively drive the valve element by the valve element driver in such a direction that the valve element is detached from the valve seat, only in a case where the attachment detector detects attachment of the valve element to the valve seat when the intake operation is performed. Thus, the number of times the valve element of the check valve is caused by the valve element driver to actively operate can be reduced, and wear of the member that constitutes the valve element driver can be suppressed.

The valve element driver may include a pin provided to be movable inside of the valve seat and an operating element that causes the pin to operate and press the valve element in such a direction that the valve element is detached from the valve seat. In that case, at least a portion, which slides inside of the valve seat, of the pin is preferably made of a same material as the valve seat. This can further suppress the wear in a case where the pin slides inside of the valve seat.

Further, diamond-like carbon coating may be applied to at least one of an outer peripheral surface of the pin and an inner side surface of the valve seat. Diamond-like carbon has excellent slidability and wear resistance, thereby being able to further suppress the wear in a case where the pin slides inside of the valve seat.

Advantageous Effects of Invention

In the liquid sending device according to the present invention, attachment of the valve element to the valve seat can be easily detected based on whether the pressure in the pump chamber of the plunger pump detected by the pressure sensor is equal to or lower than the preset threshold value.

BRIEF DESCRIPTION OF THE DRAWINGS

FIGS. 2A-2B Graphs showing one example of the temporal change of the pressure in a primary pump, and FIG. 2A shows the pressure in a case where a first check valve operates normally, and FIG. 2B shows the pressure in a case where the first check valve does not operate normally.

DESCRIPTION OF EMBODIMENTS

Hereinafter, one inventive example of a liquid sending device according to the present invention will be described below with reference to the drawings.

Figure 1:
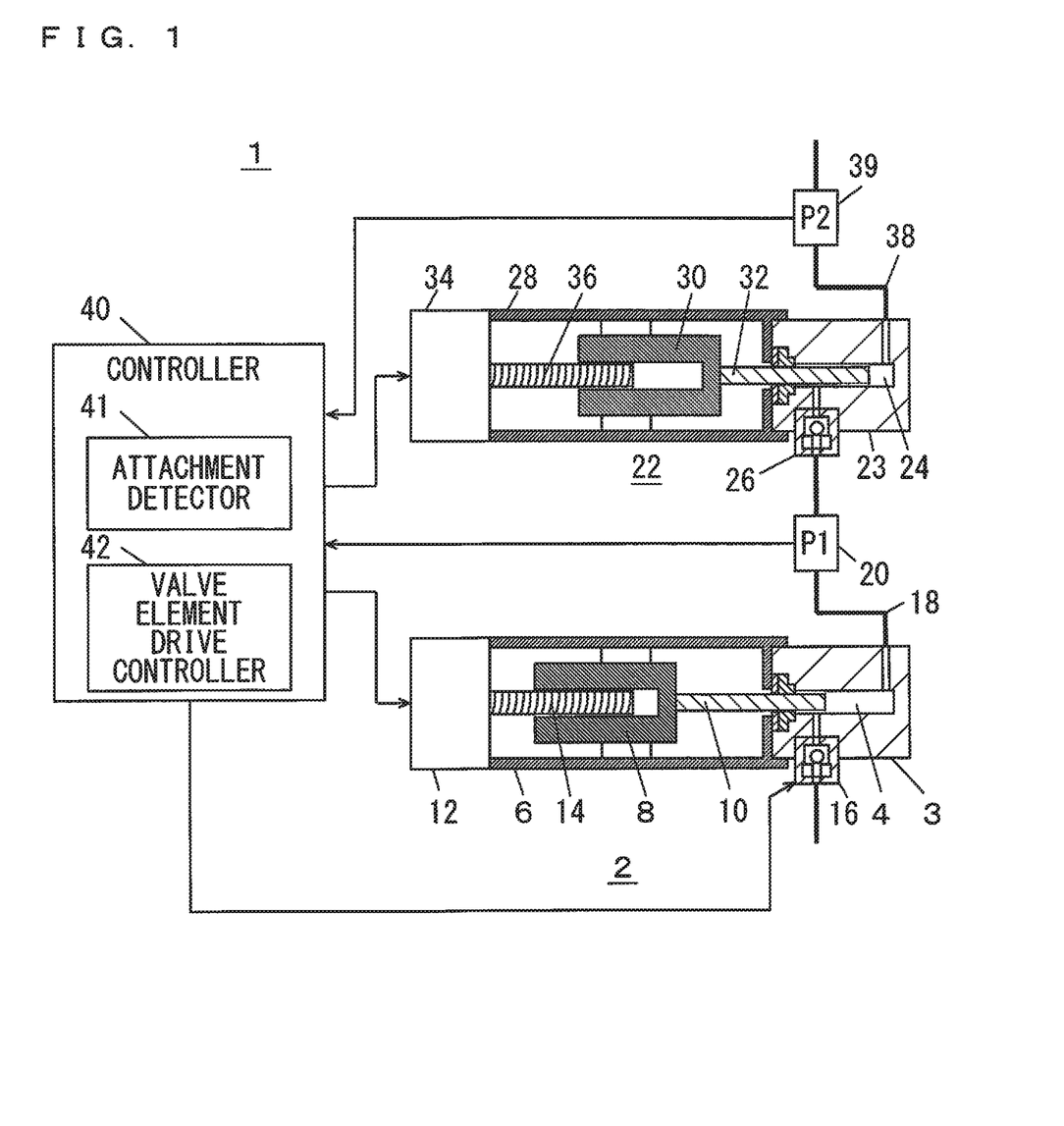
FIG. 1 A schematic diagram showing the configuration of one inventive example of a liquid sending device.

As shown in FIG. 1, the liquid sending device 1 in this inventive example includes two plunger pumps including a primary pump 2 and a secondary pump 22. The primary pump 2 and the secondary pump 22 are connected in series to each other. The primary pump 2 and the secondary pump 22 operate in a complementary manner so as to continuously send the liquid through a discharge flow path 38. While a serial-type double plunger pump in which two plunger pumps 2 and 22 are connected in series to each other will be described in this inventive example by way of example, the present invention is not limited to this. The present invention can be applied to a parallel-type double plunger pump in which two plunger pumps are connected in parallel to each other.

The primary pump 2 includes a pump head 3 having a pump chamber 4 therein and a pump body 6. The pump head 3 is provided at the tip of the pump body 6. The pump head 3 is provided with an inlet port through which liquid flows into the pump chamber 4 and an outlet port through which liquid flows out of the pump chamber 4. A first check valve 16 for preventing liquid from flowing backward is provided at the inlet port of the pump head 3. The check valve 16 has a spherical valve element that passively operates according to a pressure state in the pump chamber 4. In a case where the primary pump 2 performs a liquid intake operation, the valve element is detached from a valve seat to open the inlet port. In a case where the primary pump 2 performs a liquid discharge operation, the valve element is seated on the valve seat to close the inlet port.

Although not shown in FIG. 1, the first check valve 16 includes a valve element driver that actively drives the valve element, and the closed first check valve 16 can be forcibly opened. The operation of the first check valve 16 is controlled by a controller 40 mentioned below. The specific structure of the check valve 16 will be described below.

The tip of a plunger 10 is slidably inserted into the pump chamber 4. The proximal end of the plunger 10 is held by a crosshead 8 stored in the pump body 6. The crosshead 8 moves in one direction (the left-and-right direction in the diagram) in the pump body 6 by rotation of a feed screw 14, and the plunger 10 moves in the one direction accordingly. A primary pump drive motor 12 that rotates the feed screw 14 is provided at the proximal end of the pump body 6. The primary pump drive motor 12 is a stepping motor.

The secondary pump 22 includes a pump head 23 having a pump chamber 24 therein, and a pump body 28. The pump head 23 is provided at the tip of the pump body 28. The pump head 23 is provided with an inlet port through which liquid flows into the pump chamber 24 and an outlet port through which liquid flows out of the pump chamber 24. A second check valve 26 for preventing liquid from flowing backward is provided at the inlet port of the pump head 23. The second check valve 26 has a spherical valve element that passively operates according to a pressure state in the pump chamber 24. In a case where the secondary pump 22 performs a liquid intake operation, the valve element is detached from a valve seat to open the inlet port. In a case where the secondary pump 22 performs a liquid discharge operation, the valve element is seated on the valve seat to close the inlet port.

The tip of a plunger 32 is slidably inserted into the pump chamber 24. The proximal end of the plunger 32 is held by a crosshead 30 stored in the pump body 28. The crosshead 30 moves in one direction (the left-and-right direction in the diagram) in the pump body 28 by rotation of a feed screw 36, and the plunger 32 moves in the one direction accordingly. A secondary pump drive motor 34 that rotates the feed screw 36 is provided at the proximal end of the pump body 28. The secondary pump drive motor 34 is a stepping motor.

The inlet port of the pump head 3 is connected to a container (not shown), storing the liquid to be sent, via a flow path. The inlet port of the pump head 23 is connected to the outlet port of the pump head 3 via a connection flow path 18. A first pressure sensor 20 for detecting the pressure (P1) in the pump chamber 4 is provided on the connection flow path 18.

A discharge flow path 38 is connected to the outlet port of the pump head 23. The discharge flow path 38 communicates with an analysis flow path of a liquid chromatograph, for example. A second pressure sensor 39 for detecting a liquid sending pressure (P2) is provided on the discharge flow path 38.

The operations of the primary pump drive motor 12 and the secondary pump drive motor 34 are controlled by the controller 40. The controller 40 causes the primary pump 2 and the secondary pump 22 to operate in a complementary manner such that the flow rate of the liquid sent through the discharge flow path 38 is a preset target flow rate. The controller 40 is realized by a dedicated computer or a general-purpose personal computer that stores an arithmetic element and a program that realizes a specific function when being executed by the arithmetic element.

The controller 40 includes an attachment detector 41 and a valve element drive controller 42. The attachment detector 41 and the valve element drive controller 42 are the functions obtained when the arithmetic element executes a predetermined program.

The attachment detector 41 is configured to detect the attachment of the valve element to the valve seat in the first check valve 16 based on the pressure (P1) in the pump chamber 4 detected by the first pressure sensor 20. Only in a case where the attachment detector 41 detects the attachment of the valve element to the valve seat in the first check valve 16, the valve element drive controller 42 is configured to drive the valve element driver of the first check valve 16 and cause the valve element to actively detach from the valve seat and forcibly open the first check valve 16.

Figure 2A:
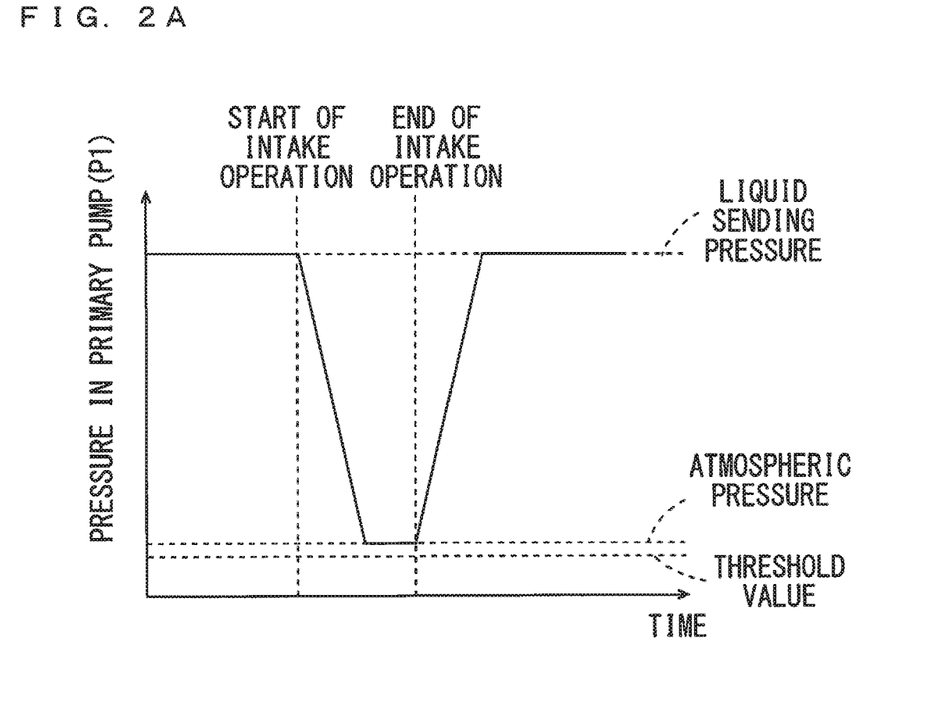

As shown in FIG. 2A, in a case where the first check valve 16 operates normally, when the primary pump 2 starts performing the intake operation, and the pressure in the pump chamber 4 becomes negative, the first check valve 16 is opened, and the liquid flows into the pump chamber 4. The pressure in the pump chamber 4 is maintained close to an atmospheric pressure while the primary pump 2 is performing the intake operation.

Figure 2B:
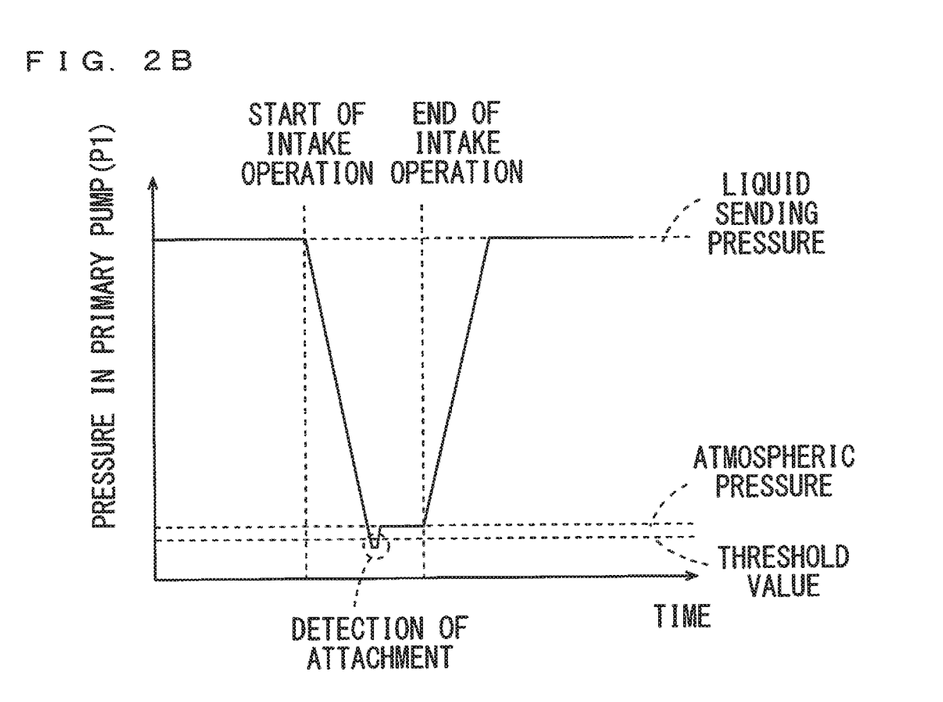

Meanwhile, in a case where the valve element is attached to the valve seat in the first check valve 16, and the first check valve 16 stops operating normally, even when the primary pump 2 starts performing the intake operation, and the pressure in the pump chamber 4 becomes negative, the first check valve 16 stays closed, and the pressure in the pump chamber 4 further decreases. As such, it is possible to determine whether the valve element is attached to the valve seat in the first check valve 16 by setting a value slightly lower than the atmospheric pressure as a threshold value and comparing the pressure (P1) in the pump chamber 4 with the threshold value.

In this inventive example, as shown in FIG. 2B, in a case where the pressure (P1) in the pump chamber 4 detected by the first pressure sensor 20 becomes equal to or lower than the preset threshold value, the attachment detector 41 detects the attachment of the valve element to the valve seat in the first check valve 16. Further, the valve element drive controller 42 is configured to actively drive the valve element to forcibly open the first check valve 16 when the attachment of the valve element to the valve seat is detected.

Figure 3:
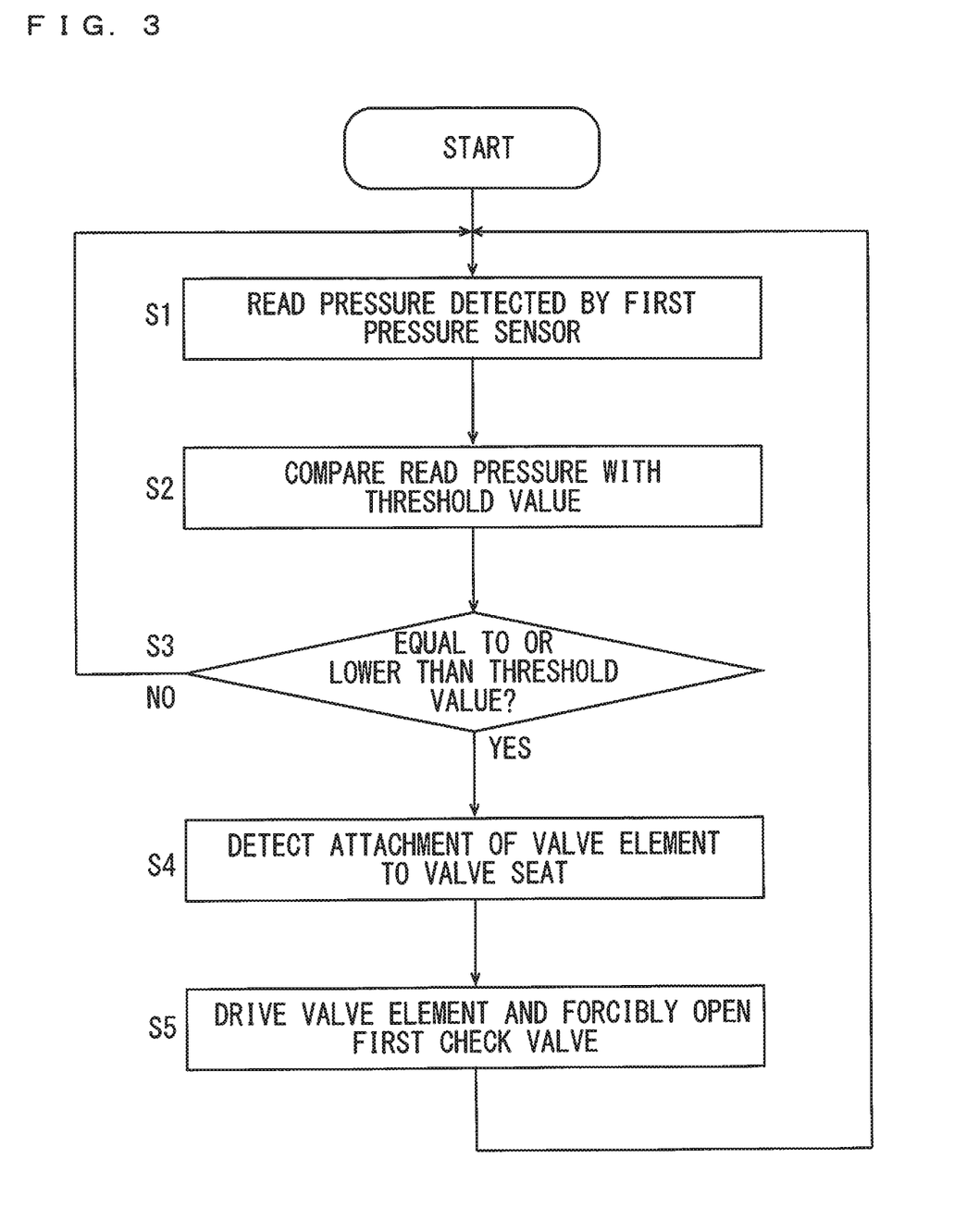
FIG. 3 A flow chart for explaining one example of the drive control of the first check valve in the same inventive example.

The flowchart of FIG. 3 shows a drive control operation of the first check valve 16 realized by the attachment detector 41 and the valve element drive controller 42.

The controller 40 receives the output of the first pressure sensor 20 at short time intervals (step S1). The attachment detector 41 compares the output of the first pressure sensor 20 received by the controller 40 with the preset threshold value (step S2). In a case where the output of the first pressure sensor 20 is equal to or lower than the threshold value, the attachment detector 41 detects the attachment of the valve element to the valve seat in the first check valve 16 (step S4). The valve element drive controller 42 actively drives the valve element of the first check valve 16 to forcibly open the first check valve 16 only when the attachment detector 41 detects the attachment of the valve element to the valve seat (step S5).

In the above operation, the "output of the first pressure sensor 20," which the attachment detector 41 compares with the threshold value does not only mean one output value received by the controller 40 but may mean the average value of a plurality of output values of the first pressure sensor 20 most recently received by the controller 40. Further, the attachment detector 41 may also detect attachment of the valve element to the valve seat only in a case where the predetermined number of output values successively received by the controller 40 are equal to or lower than the threshold value.

Figure 4:
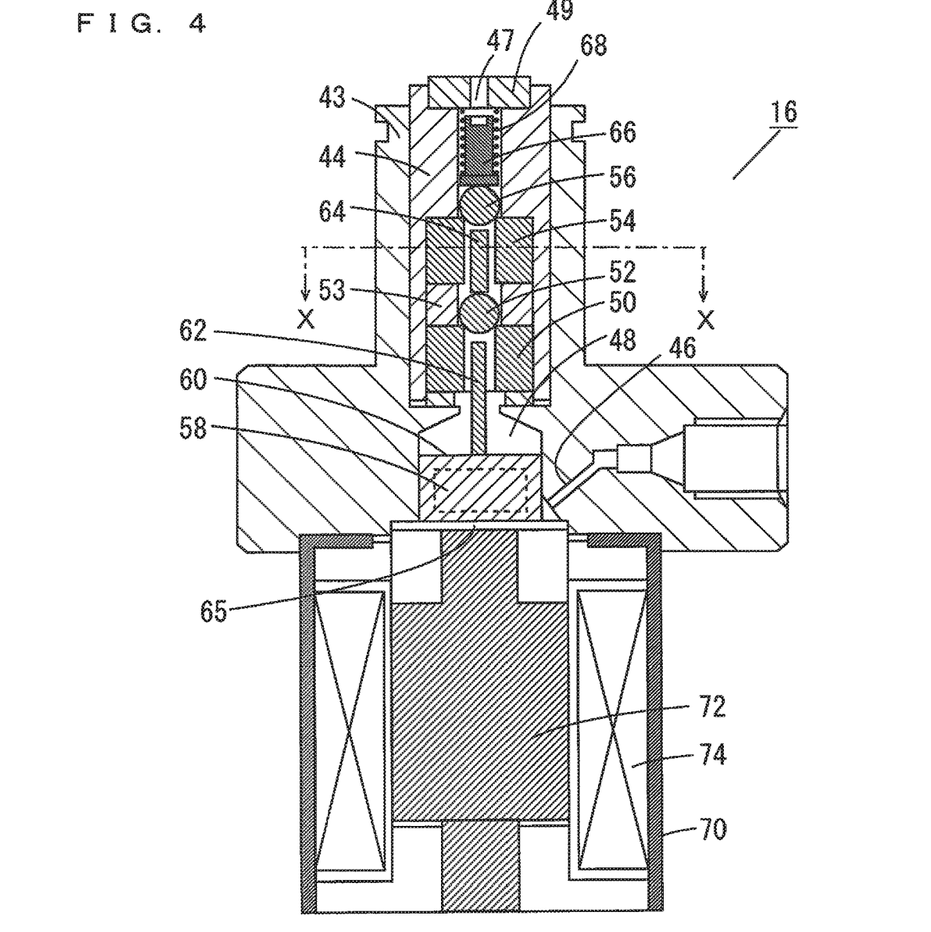
FIG. 4 A cross sectional view showing the structure of the first check valve in the same inventive example.

Next, one example of structure of the first check valve 16 will be described with reference to FIGS. 3, 4 and 5.

The first check valve 16 includes the T-shape valve body 43 that has a convex portion projecting upward and a drive mechanism 70 attached to the lower surface of the valve body 43. The valve body 43 has a hollow inside, and provided with a liquid inlet port 46 through which liquid flows into the hollow from a side surface and a liquid outlet port 47 through which liquid flows out in the upper end surface.

A cylindrical housing 44 is inserted from the tip of the convex portion of the valve body 43. A linear flow path through which the liquid, that has flown in from the liquid inlet port 46 of the valve body 43, flows in the one direction toward the liquid outlet port 47 is formed inside of the housing 44. A ring-shape gasket 49 is attached to the upper end surface of the housing 44, and a through hole inside the gasket 49 serves as the liquid outlet port 47 through which the liquid flows out.

A valve seat 50, a valve element 52, a valve seat 54 and a valve element 56 are stored in the axial direction (the vertical direction) of the housing 44 from below in the hollow inside of the housing 44. The valve seats 50 and 54 are cylindrical members that constitute part of the linear flow path in the housing 44. The positions of the valve seats 50 and 54 are fixed, and the valve elements 52 and 56 are seated at the respective openings in the upper surfaces of the valve seats 50 and 54.

A spacer 53 is interposed between the valve seats 50 and 54. The spacer 53 has an inner diameter slightly larger than the outer diameter of the valve element 52. The valve element 52 is arranged inside of the spacer 53 so as to be movable in the axial direction of the housing 44. The valve element 56 is also arranged above the valve seat 54 so as to be movable in the axial direction of the housing 44. Members in other shapes such as conical plugs may be used as the first and second valve elements instead of the valve elements 52 and 56. The valve seats 50 and 54 are made of the same material, and the valve elements 52 and 56 are made of the same material.

The valve body 43 has a cylinder 48 at a position directly below the housing 44. The cylinder 48 is a space for movement of an operating element 60, in which a permanent magnet 58 is buried, in the housing 44 in the axial direction (vertical direction). The operating element 60 is stored in the cylinder 48 so as to be movable in the vertical direction. The operating element 60 holds the proximal end of a pin 62. The pin 62 is arranged vertically so as to extend toward the valve element 52. With the valve element 52 seated on the valve seat 50, a clearance of about 0.4 mm, for example, is present between the pin 62 and the valve element 52. A sheet 65 made of PTFE (polytetrafluoroethylene), for example, is provided as a bottom surface of the cylinder 48. The operating element 60 is supported by the sheet 65.

A pin 64 is vertically arranged between the valve elements 52 and 56 to extend in the axial direction of the housing 44. The pin 64 is provided inside the valve seat 54 so as to be vertically movable. The length of the pin 64 is shorter than the clearance between the valve elements 52 and 56. When the valve element 52 is seated on the valve seat 50, and the valve element 56 is seated on the valve seat 54, the clearance of about 0.3 mm, for example, is present between the pin 64 and the valve element 56.

Figure 5:
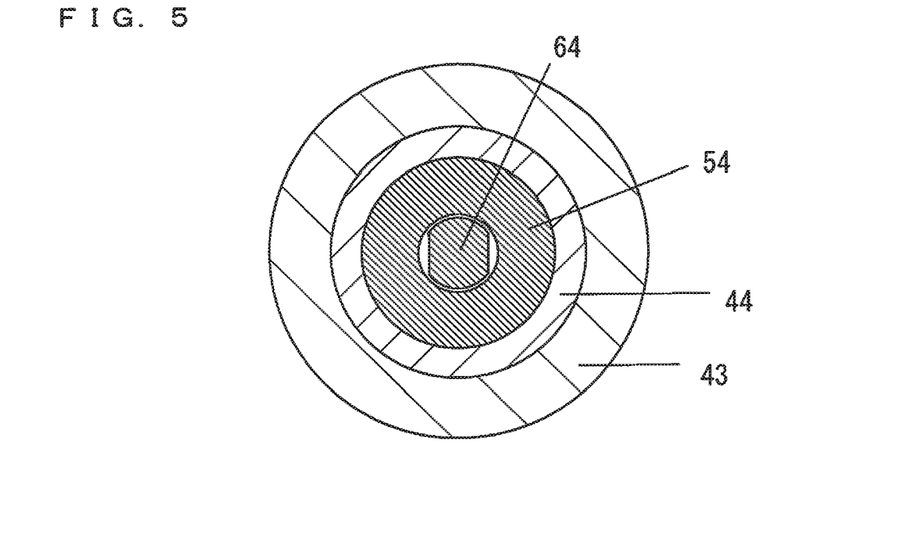
FIG. 5 A cross sectional view of the first check valve taken along the line X-X shown in FIG. 4.

As shown in FIG. 5, the shape of the cross section of the pin 64 is a circle having an outer diameter substantially equal to the inner diameter of the valve seat 54 with partially missing parts. Thus, when the pin 64 moves in the vertical direction inside the valve seat 54, the axis of the pin 64 is not inclined with respect to the vertical direction, and the inner peripheral surface of the valve seat 54 and the pin 64 are prevented from locally coming into contact with each other and wearing out.

Further, the pin 64 is made of the same material as the valve seat 54 (sapphire or zirconia, for example). Although the pin 64 slides on the inner peripheral surface of the valve seat 54, significant wear of one of the pin 64 and the valve seat 54 is prevented because the pin 64 and the valve seat 54 are both made of the same material. Further, the pin 62 and the valve seat 50 are also made of the same material (sapphire or zirconia, for example), so that significant wear of one of the pin 62 and the valve seat 50 is prevented.

Figure 7:
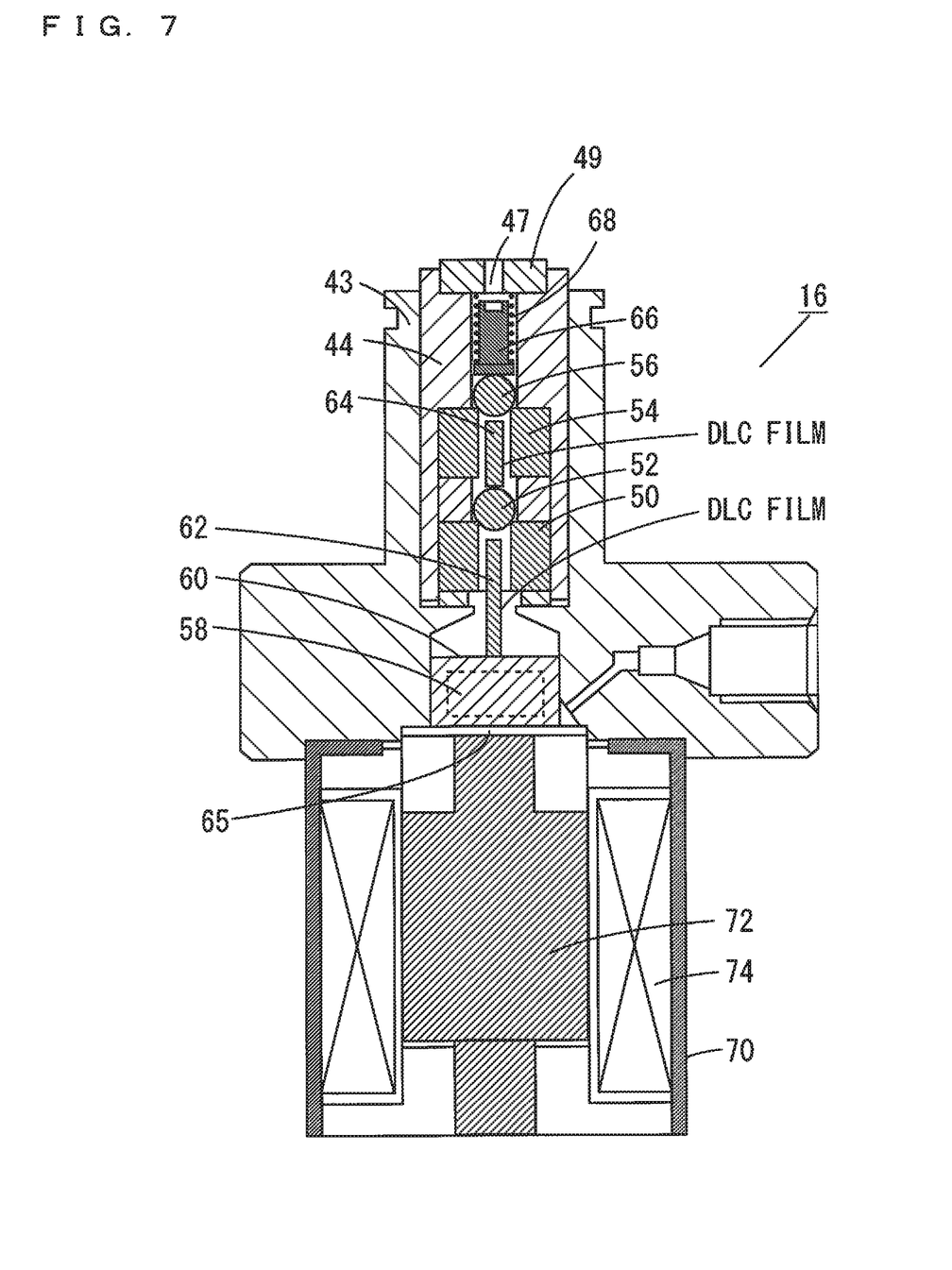
FIG. 7 A cross sectional view showing one example of another structure of a first check valve.

Further, as shown in FIG. 7, a diamond-like carbon (DLC) film may be formed on the outer peripheral surfaces of the pins 62 and 64 in order to prevent wear caused by sliding between the pin 62 and the valve seat 50 and wear caused by sliding between the pin 64 and the valve seat 54. The DLC film may be formed on the inner peripheral surfaces of the valve seats 50 and 54.

A weight 66 is provided between the gasket 49 attached to the upper end of the housing 44 and the valve element 56. The weight 66 is biased vertically in the downward direction by an elastic member 68 made of a coil spring, for example. Thus, the valve element 56 is pressed toward the valve seat 54 at all times.

The drive mechanism 70 includes an iron core 72 provided directly below the sheet 65 that supports the operating element 60, and a coil 74 arranged to be spaced apart from the side surface of the iron core 72. When a current flows through the coil 74, a magnetic field passing through the operating element 60 is generated, and the operating element 60 is lifted upward from the sheet 65 by 0.9 mm, for example.

Figure 6:
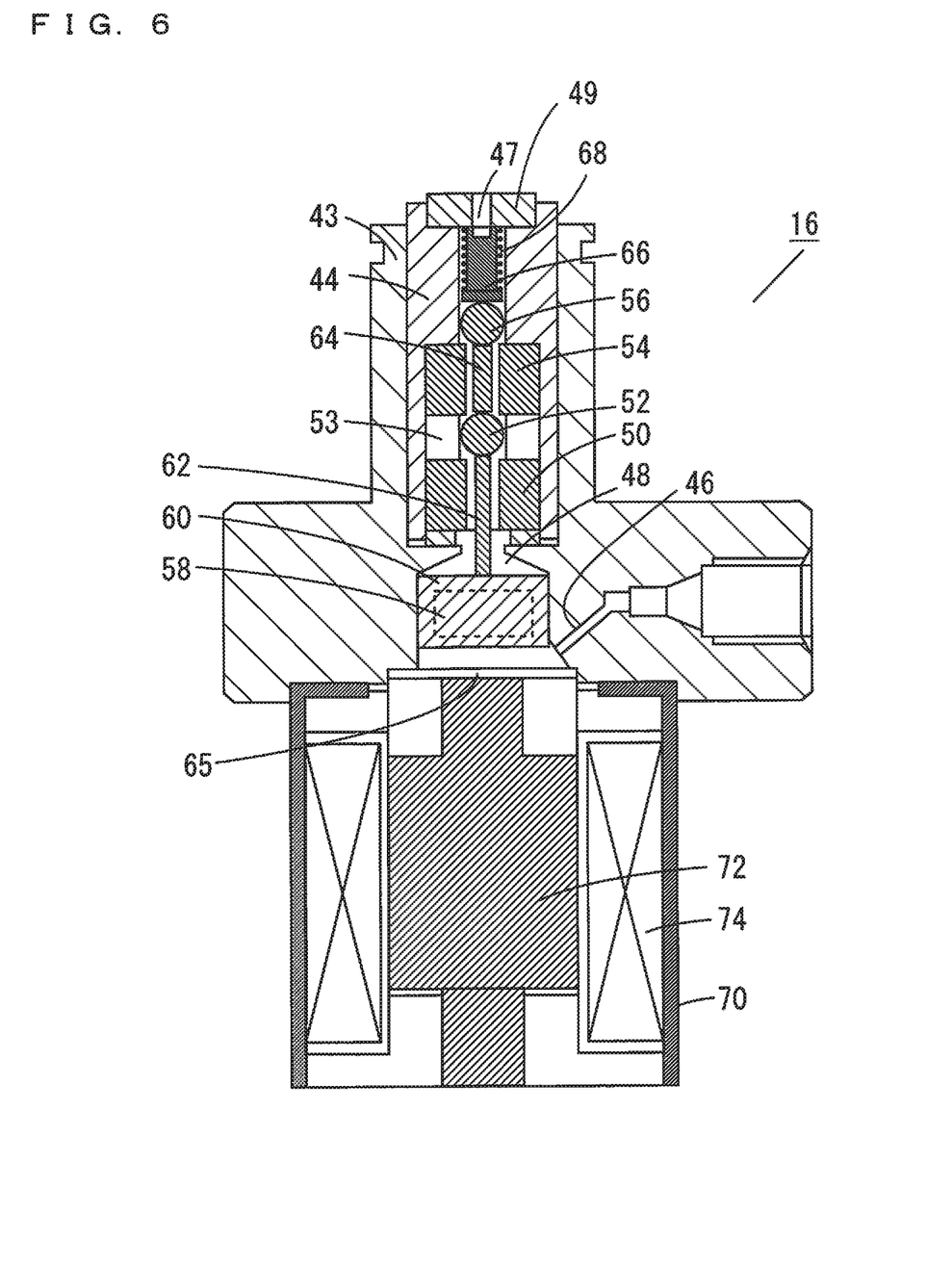
FIG. 6 A cross sectional view showing the first check valve being actively opened.

When the operating element 60 is lifted upwardly, the pin 62 presses the valve element 52 upwardly as shown in FIG. 6, and the valve element 52 is lifted from the valve seat 50 by 0.5 mm. When the valve element 52 is lifted from the valve seat 50, the pin 64 is accordingly lifted and presses the valve element 56 upward. Thus, the valve element 56 is lifted from the position of the valve element 56 being seated on the valve seat 54 by 0.2 mm. Therefore, the first check valve 16 is opened.

When the first check valve 16 is to be opened, the pin 62 is put in an open state by generation of a magnetic field in a direction that repels the permanent magnet 58 such that the operating element 60 moves upward by the drive mechanism 70. The valve element 52 is lifted by the pin 62, and the valve element 56 is lifted by the pin 64. Therefore, the valve elements 52 and 56 are actively lifted by the pins 62 and 64, respectively. Thus, even in a case where the valve seat 50 is attached to the valve element 52, or the valve element 56 is attached to the valve seat 54, the valve can be opened reliably.

On the contrary, when the valve is to be closed, the drive mechanism 70 does not generate a magnetic field. Thus, the operating element 60 is lowered to the sheet 65 by its own weight. When the operating element 60 is lowered, the valve element 52 is lowered by its own weight and the weight of the pin 64 to be seated on the valve seat 50. The valve element 56 is seated on the valve seat 54 since the inside of the pump chamber 4 is pressurized, and the valve element 56 is pressed downward by the weight 66.

The operating element 60, the pins 62 and 64 and the drive mechanism 70 constitute a valve element driver for actively operating the valve elements 52 and 56.

In the first check valve 16 described with reference to FIGS. 3 to 7, when an attempt is made to actively drive the valve elements 52 and 56, the operating element 60 operates and wear of the operating element 60 itself and the pin 62 is promoted. However, the liquid sending device 1 of this inventive example causes the drive mechanism 70 to generate a magnetic field and drive the operating element 60 only in a case where the attachment of the valve element 52 to the valve seat 50 and/or the attachment of the valve element 56 to the valve seat 54 is detected. Thus, the wear of the operating element 60 and the pin 62 is suppressed to the minimum.

DESCRIPTION OF REFERENCE NUMERALS

1 Liquid Sending Device
2 Primary Pump
3, 23 Pump Heads
4, 24 Pump Chambers
6, 28 Pump Bodies
8, 30 Crossheads
10, 32 Plungers
12, 34 Motors
14, 36 Feed Screws 16, 26 Check Valves
20, 39 Pressure Sensors
22 Secondary Pump
40 Controller
41 Attachment Detector
42 Valve Element Drive Controller
43 Valve Body
44 Housing
46 Liquid Inlet Port
47 Liquid Outlet Port
48 Cylinder
49 Gasket
50, 54 Valve Seats
52, 56 Valve Elements
53 Spacer
58 Permanent Magnet
60 Operating Element
62, 64 Pins
66 Weight
68 Elastic Member
70 Drive Mechanism
72 Iron Core
74 Coil

The invention claimed is:

1. A liquid sending device comprising:
a plunger pump, which performs an intake operation of liquid to and a discharge operation of liquid from a pump chamber and in which pressure in the pump chamber in a case where the intake operation is performed is lower compared to a case where the discharge operation is performed,
a check valve that is provided at an inlet port of the plunger pump, has a spherical valve element and a valve seat on which the valve element is to be seated, and passively operates according to the pressure in the pump chamber in such a direction that the valve element is seated on or detached from the valve seat,
a pressure sensor that detects the pressure in the pump chamber; and
a controller that compares the pressure in the pump chamber detected by the pressure sensor while the plunger pump is performing the intake operation with a preset threshold value and determines that the valve element is attached to the valve seat in a case where the controller determines that the pressure in the pump chamber is equal to or lower than the threshold value, wherein
the check valve has a valve element driver for actively driving the valve element seated on the valve seat in such a direction that the valve element is detached from the valve seat,
the liquid sending device includes a valve element drive controller for controlling an operation of the valve element driver, and
the valve element drive controller is configured to actively drive the valve element by the valve element driver in such a direction that the valve element is detached from the valve seat, only in a case where the controller detects attachment of the valve element to the valve seat.

2. The liquid sending device according to claim 1, wherein
the valve element driver includes a pin provided to be movable inside of the valve seat and an operating element that causes the pin to operate and press the valve element in such a direction that the valve element is detached from the valve seat, and
at least a portion, which slides inside of the valve seat, of the pin is made of a same material as the valve seat.

3. The liquid sending device according to claim 1, wherein
the valve element driver includes a pin provided to be movable inside of the valve seat and an operating element that causes the pin to operate and press the valve element in such a direction that the valve element is detached from the valve seat, and
diamond-like carbon coating is applied to at least one of an outer peripheral surface of the pin and an inner side surface of the valve seat.

4. The liquid sending device according to claim 1, wherein
the threshold value is a value lower than an atmospheric pressure.

* * * * *